United States Patent [19]

Higuchi et al.

[11] Patent Number: 5,068,304

[45] Date of Patent: Nov. 26, 1991

[54] MOISTURE-CURABLE RESIN COMPOSITION

[75] Inventors: Toshihiko Higuchi, Yokohama; Yasuhiko Nakano, Zushi; Nobuaki Kunii, Yokohama; Yoshiyuki Yamaguchi, Yokohama; Shigeyuki Kozawa, Yokohama, all of Japan

[73] Assignee: Asahi Glass Company Ltd., Tokyo, Japan

[21] Appl. No.: 446,661

[22] Filed: Dec. 6, 1989

[30] Foreign Application Priority Data

Dec. 9, 1988 [JP] Japan .................................. 63-310149
Apr. 11, 1989 [JP] Japan ...................................... 1-89827

[51] Int. Cl.$^5$ ............................................. C08G 77/04
[52] U.S. Cl. .......................................... 528/28; 528/25; 528/29; 528/31; 528/38
[58] Field of Search ................... 528/28, 29, 25, 38, 528/31

[56] References Cited

U.S. PATENT DOCUMENTS 3,485,861 12/1969 McKellar ........................... 260/448.2
4,687,851 8/1987 Laughner ............................ 544/398
4,822,850 4/1989 Yashuda et al. ....................... 528/28
4,889,903 12/1989 Baghdachi ............................ 528/28

FOREIGN PATENT DOCUMENTS 0070475 1/1983 European Pat. Off. .

Primary Examiner—Melvyn I. Marquis
Attorney, Agent, or Firm—Oblon, Spivak, McClelland, Maier & Neustadt

[57] ABSTRACT

A moisture-curable resin composition containing a hydrolyzable silyl group-containing polyether compound as a curable component, said polyether compound comprising polyoxyalkylene chains derived from a polyoxyalkylene polyol having a hydroxyl value (x mgKOH/g) of from 5 to 35, a total degree of unsaturation (y meq/g) of not higher than 0.07 meq/g and $y \leq 0.9/(x-10)$, from 2 to 8 hydroxyl groups, and a content of oxyalkylene groups having at least 3 carbon atoms, of at least 60% by weight, and a hydrolyzable silyl group-containing terminal group present at least 1.3 terminals on the average of said polyoxyalkylene chains, said terminal group having a urethane bond linked to the polyoxyalkylene chain.

14 Claims, No Drawings

MOISTURE-CURABLE RESIN COMPOSITION

The present invention relates to a moisture-curable resin composition containing a hydrolyzable silyl group-containing polyether compound as a curable component which contains a urethane bond and which is curable to form a rubber-like substance when exposed to moisture in air.

As a room temperature curable resin of two component system, a Thiokol type and an urethane type are known. However, they are not yet fully satisfactory with respect to e.g. the operational efficiency and the pot life after the two components have been mixed. To overcome such drawbacks, researches have been active to develop a suitable one component system. As a one component system, a Thiokol type, a urethane type and a silicone type are common, but they have their own merits and demerits with respect to e.g. curing properties, adhesiveness and costs. None of them is fully satisfactory. Under these circumstances, the present inventors have paid a particular attention to a silicone type one component system moisture curable compound which is curable at room temperature and have conducted various studies for a process of producing such a compound at a low cost. Heretofore, as a process for producing a silicone type one component system at a low cost, it has been known to employ a process of reacting a compound having a hydrolyzable silyl group and an active hydrogen-containing group, with an isocyanate group-containing prepolymer obtained by reacting a polyoxyalkylene polyol with a stoichiometrically excess amount of a polyisocyanate compound, or a process of reacting a compound having an $\alpha,\beta$-unsaturated group and an active hydrogen-containing group with such a prepolymer, followed by reacting a hydrosilane having a hydrolyzable group thereto (U.S. Pat. No(s). 3,408,321, 3,448,072, 3,592,795 and 3,632,557).

When a moisture curable resin is to be used as a sealing agent, it is necessary that elongation of the cured product will be large. Such elongation is influenced by the nature of polymer chains in the moisture curable compound or by the molecular weight. For example, polyester chains contain a number of ester bonds having high coagulating properties, whereby the elongation of the cured product will be small. Ether bonds in polyoxyalkylene chains have low coagulating properties, whereby a large elongation will be brought about. On the other hand, the larger the molecular weight of the polymer chains, the larger the elongation will be. However, with respect to the polyoxyalkylene polyol, it is difficult to produce a polyoxyalkylene polyol having a high molecular weight because of a side reaction of the ring-opening addition polymerization reaction to form an oxyalkylene group having at least 3 carbon atoms as the main oxyalkylene group. For example, the molecular weight of polyoxypropylene diol is usually not higher than 3,000. To increase the molecular weight of a polyoxyalkylene polyol, polymerization of a polyoxyalkylene polyol is employed. The polyoxyalkylene polyol to be employed for such polymerization is a diol, and a polyol having three or more hydroxyl groups is not used for such polymerization since the number of branches will otherwise be increased. Namely, to react a polyoxyalkylene diol with a polyisocyanate compound, it is common to employ a method for producing a prepolymer having a high molecular weight by minimizing the stoichiometrically excess amount of the polyisocyanate compound. However, such a method will bring about a number of urethane bonds among polyoxyalkylene chains, and the elongation of the cured product tends to be small because of the coagulating properties of such urethane bonds. There have been known a method of polymerizing a polyoxyalkylene diol with only an ether bond (for example a method of converting a hydroxyl group to sodium alkoxide, which is then reacted with dichloromethane, as disclosed in Japanese Unexamined Patent Publication No. 240320/1987). However, this method is cumbersome and costly. Further, it is difficult to control the molecular weight of the product by the polymerization, and the molecular weight distribution of the resulting polymer tends to be wide.

The present invention provides a moisture-curable resin composition containing a hydrolyzable silyl-containing polyether compound capable of providing a cured product having large elongation.

More specifically, the present invention provides a moisture-curable resin composition containing a hydrolyzable silyl group-containing polyether compound as a curable component, said polyether compound comprising polyoxyalkylene chains derived from a polyoxyalkylene polyol having a hydroxyl value (x mgKOH/g) of from 5 to 35, a total degree of unsaturation (y meq/g) of not higher than 0.07 meq/g and $y \leq 0.9/(x-10)$, from 2 to 8 hydroxyl groups, and a content of oxyalkylene groups having at least 3 carbon atoms, of at least 60% by weight, and a hydrolyzable silyl group containing terminal group present at least at each of two terminals of said polyoxyalkylene chains, said terminal group having a urethane bond linked to the polyoxyalkylene chain.

Now, the present invention will be described in further detail with reference to the preferred embodiments.

The polyether compound of the present invention is obtained by using as a starting material a polyoxyalkylene polyol having a very large molecular weight and converting its terminal hydroxyl groups to hydrolyzable silyl group-containing terminal groups, wherein such terminal groups have urethane bonds linked to polyoxyalkylene chains. Such urethane bonds are formed by the reaction of isocyanate groups with hydroxyl groups of the polyoxyalkylene polyol.

In the present invention, the polyoxyalkylene polyol is obtained by ring-opening addition polymerization of an alkylene oxide to an initiator having at least two functional groups reactive with an alkylene oxide. In such a case, it is common to employ an alkali catalyst such as an alkali metal hydroxide. However, if such a catalyst is used, a polyoxyalkylene polyol having a high degree of unsaturation tends to be formed, as described hereinafter, and if the production rate thereof increases, it becomes difficult to produce a polyoxyalkylene polyol having a high molecular weight. The polyoxyalkylene polyol in the present invention is required to be a polyoxyalkylene polyol having a low degree of unsaturation which is obtainable by using a catalyst which will be described hereinafter.

Further, the polyoxyalkylene polyol in the present invention has residues of the initiator, polyoxyalkylene chains made of a number of oxyalkylene groups derived from the alkylene oxide and hydroxyl groups present at the terminals of the polyoxyalkylene chains. It is preferred that the polyoxyalkylene chains do not substantially contain bonds formed by polymerization of a polyoxyalkylene polyol, other than the above-mentioned urethane bonds. In the present invention, it is important that the polyoxyalkylene polyol to be used as the starting material has a hydroxyl value (x mgKOH/g) within a range of from 5 to 35 and a total degree of unsaturation (y meq/g) of not higher than 0.07 meq/g and $y \leq =0.9/(x-10)$. By using a polyoxyalkylene polyol having such a high molecular weight, it becomes possible for the first time to obtain a hydrolyzable silyl-group containing polyether compound having a high molecular weight. When this is used as a sealing agent, it is possible to obtain a cured product having a very large elongation. Thus, it will be useful in a wide range of applications. Further, by using a polyoxyalkylene polyol having a total degree of unsaturation of not higher than 0.07 meq/g and $y \leq 0.9/(x-10)$, it is possible to avoid a deterioration of the physical properties due to an unsaturated monool as a by-product.

In the above formula, when x is about 22.9, y is 0.07. Accordingly, in the present invention, when x is within a range of from about 22.9 to 35, y follows the above formula, and when x is not higher than about 22.9, y is not higher than 0.07. In the present invention, a preferred hydroxyl value (x) of the polyoxyalkylene polyol is from 5 to 28, more preferably from 5 to 24. Further, a preferred upper limit of the total degree of unsaturation (y) is 0.04. The number of hydroxyl groups (hereinafter sometimes represented by N) of the polyoxyalkylene polyol, i.e. an average number of hydroxyl groups per molecule is from 2 to 8, preferably from 2 to 4. As described hereinafter, in the present invention, the polyoxyalkylene polyol contains at least 60% by weight, preferably at least 70% by weight, of oxyalkylene groups having at least 3 carbon atoms, as oxyalkylene groups. Other oxyalkylene groups, such as oxyethylene groups, have a hydrophilic nature, and if their amount is substantial, they adversely affect the physical properties of the finally cured resin. As the oxyalkylene groups having at least 3 carbon atoms, oxyalkylene groups having 3 or 4 carbon atoms derived from 1,2-propylene oxide, 1,2-butylene oxide or 2,3-butylene oxide, are preferred. Particularly preferred are oxypropylene groups derived from 1,2-propylene oxide (hereinafter referred to simply as propylene oxide). 1,2-Butylene oxide or 2,3-butylene oxide (hereinafter both will be referred to simply as butylene oxide) may be substituted for a part or whole of the propylene oxide. Ethylene oxide may be used in combination with other alkylene oxides. The amount of oxyethylene groups in the polyoxyalkylene polyol is at most 40% by weight, preferably at most 30% by weight, most preferably at most 20% by weight. When two or more different kinds of oxyalkylene groups are present in the polyoxyalkylene polyol, they may be present in a random state or in a block state.

The polyoxyalkylene polyol usually contains an unsaturated monool formed by a side reaction during its preparation. Generally speaking, the degree of unsaturation increases as the hydroxyl value of the polyoxyalkylene polyol decreases. Because, the lower the hydroxyl value, the larger the amount of the oxyalkylene groups having at least three carbon atoms, particularly oxypropylene groups, as the main oxyalkylene groups of the polyoxyalkylene polyol. Consequently, the amount of the reaction of the alkylene oxide having at least 3 carbon atoms increases during its preparation, whereby a side reaction of the same alkylene oxide (a side reaction to form a unsaturated group) increases to increase the degree of unsaturation. Such a side reaction of the alkylene oxide having at least 3 carbon atoms is likely to take place when the catalyst for the reaction is an alkali catalyst such as an alkali metal compound (such as alkali metal hydroxide). It is particularly difficult to produce a polyoxyalkylene polyol having a low degree of saturation and a low hydroxyl value by using an alkali catalyst. Preferably other catalysts may be employed for the preparation of the polyoxyalkylene polyol. Such catalysts include, for example, metal polyphiline (see U.S. Pat. No. 4,654,417), LiPF$_6$ (see Japanese Unexamined Patent Publication No. 197726/1985), a composite metal cyanide complex, or a complex of a metal with a chelating agent having at least three ligands (see Japanese Unexamined Patent Publication No. 197726/1985). It is particularly preferred to employ a composite metal cyanide complex catalyst such as a hexacyanocobaltate zinc complex. This catalyst and a process for producing a polyoxyalkylene polyol using it are disclosed, for example, in the following patents: U.S. Pat. No(s). 3,278,457, 3,278,458, 3,278,459, 3,427,334, 3,427,335, 3,829,505, 3,941,849, 4,355,188, 4,472,560 and 4,721,818.

The above-mentioned polyoxyalkylene polyol is prepared by a method of ring-opening addition polymerization of an alkylene oxide alone, or a method of ring-opening addition polymerization of an alkylene oxide with a polyvalent initiator. As the alkylene oxide, at least one of propylene oxide and butylene oxide, or such an alkylene oxide and ethylene oxide, may be used. It is particularly preferred to employ propylene oxide alone or in combination with ethylene oxide.

The polyvalent initiator to be used for the preparation of the above polyoxyalkylene polyol, includes a polyhydric alcohol, a polyvalent phenol, a polyamine and an alkanol amine. For example, it includes ethylene glycol, diethylene glycol, propylene glycol, dipropylene glycol, neopentyl glycol, 1,4-butanediol, 1,6-hexanediol, glycerol, trimethylolpropane, pentaerythritol, diglycerol, dextrose, sucrose, bisphenol A, ethylene diamine and a polyoxyalkylene polyol obtainable by reacting at least one of these initiators with an alkylene oxide and having a molecular weight lower than the desired product (i.e. a high hydroxyl value). These initiators may be used alone or in combination as a mixture of two or more. Particularly preferred polyvalent initiators are a polyhydric alcohol, a polyvalent phenol and a polyoxyalkylene polyol having a lower molecular weight obtained by adding an alkylene oxide to any one of such a polyhydric alcohol and polyvalent phenol.

Hereinafter, the polyoxyalkylene polyol in the present invention will be represented by A$(\text{-OH})_n$ wherein A is a n-valent residue obtained by removing a hydroxyl group from a polyoxyalkylene polyol, and n is the number of hydroxyl groups N. The hydrolyzable silyl group-containing polyether compound having a hydrolyzable silyl group-containing terminal group represented by the formula (1) given hereinafter, is preferably a compound of the following formula:

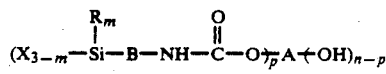

wherein p is an integer of from 1.3 to n, preferably p = 1.5 n.

The hydrolyzable silyl group-containing polyoxyalkylene polyol compound of the present invention contains at least 1.3, preferably at least about 1.5, hydrolyzable silyl group-containing terminal groups of the following formula (1) in one molecule.

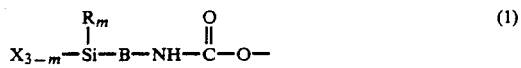

$$X_{3-m}-\underset{\underset{R_m}{|}}{Si}-B-NH-\overset{\overset{O}{\|}}{C}-O- \quad (1)$$

This terminal group is linked to a polyoxyalkylene chain having a hydroxyl group removed from a terminal of a polyoxyalkylene chain. Preferably, this terminal group is present in place of at least 1.3, preferably at least 1.5, hydroxyl groups in the polyoxyalkylene polyol. In the above formula, m is preferably an integer of 0, 1 or 2. More preferably, m is 0 or 1. B is a bivalent organic group or a bond (i.e. Si and NH being directly bonded). B may be a bivalent organic group having a urethane bond, a urea bond or other bonds. In the formula, R is a monovalent hydrocarbon group or a halogenated hydrocarbon group, such as an alkyl group or a fluoroalkyl group having at most 8 carbon atoms, preferably at most 6 carbon atoms. Particularly preferred is a lower alkyl group such as a methyl group or an ethyl group. X is a hydrolyzable group such as a halogen atom, an alkoxy group, an acyloxy group, an amide group, an amino group, an aminooxy group or a ketoximate group. A hydrolyzable group having carbon atoms among them, preferably has not more than 6 carbon atoms, more preferably not more than 4 carbon atoms. A preferred hydrolyzable group is an alkoxy group having not more than 4 carbon atoms, particularly a methoxy group or an ethoxy group. Specific examples of the hydrolyzable silyl group include a trimethoxysilyl group, a methyldimethoxysilyl group, a triethoxysilyl group, a methyldiethoxysilyl group, an ethyldiethoxysilyl group, a tributoxysilyl group, a methyldibutoxysilyl group, a tris(2-methoxyethoxy)silyl group, a triacetoxysilyl group, a methyldiacetoxysilyl group, [(CH₃)₂C=N—O-]₃Si—, (CH₃)₂N-]₃Si—, [CH₃CO(CH₃)N-]₃Si, and [(C₂H₅)₂N-]₃Si—.

The polyoxyalkylene compound having the terminal group of the formula (1), may be prepared, for example, by the following methods.

(i) A compound (a) having a hydrolyzable silyl group and an isocyanate group and a polyoxyalkylene polyol are reacted. This compound (a) is, for example, a compound represented by the following formula (2);

$$X_{3-m}-\underset{\underset{R_m}{|}}{Si}-R^1-NCO \quad (2)$$

In this case, B in the foregoing formula (1) corresponds to $R^1$ in the formula (2). X, R and m are as defined in the above formula (1), and $R^1$ is a bivalent organic group. $R^1$ is preferably a bivalent organic group having from 1 to 17 carbon atoms or a bond. Particularly preferred is a bivalent hydrocarbon group. This hydrocarbon group may contain an aromatic ring. A preferred hydrocarbon group is an alkylene group, preferably an alkylene group having from 1 to 8 carbon atoms, more preferably an alkylene group having from 2 to 6 carbon atoms. For example, a polymethylene group such as a dimethylene group, a trimethylene group or a tetramethylene group, is preferred. $R^1$ may be a urethane bond, a urea bond or an organic group having other bond formed by the reaction of an isocyanate group and a active hydrogen-containing group. Such a case will be described hereinafter in item (iii).

The compound (a) useful in this method is not limited to the compound of the formula (2) and may be a compound having two or more hydrolyzable silyl groups and an isocyanate group, or a compound having two or more isocyanate groups and a hydrolyzable silyl group.

Specific examples of a compound (e) wherein $R^1$ is a hydrocarbon group or a bond, will be shown below. However, the compound (e) is not limited to such compounds.

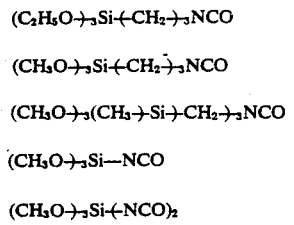

$(C_2H_5O-)_3Si-(CH_2-)_3NCO$ $(CH_3O-)_3Si-(CH_2-)_3NCO$ $(CH_3O-)_3(CH_3-)Si-)-CH_2-)_3NCO$ $(CH_3O-)_3Si-NCO$ $(CH_3O-)_3Si-(NCO)_2$ (ii) A compound (b) having an α,β-unsaturated group and an isocyanate group and a polyoxyalkylene polyol are reacted, and then a hydrosilane (c) having a hydrolyzable group is reacted thereto. This compound (b) and the hydrosilane (c) are, for example, those represented by the following formulas (3) and (4), respectively, and the resulting terminal group is represented by the following formula (5).

$$R_3-\underset{\underset{R^4}{|}}{C}=\underset{\underset{R^5}{|}}{C}-R^2-NCO \quad (3)$$

$$X_{3-m}-\underset{\underset{R_m}{|}}{Si}-H \quad (4)$$

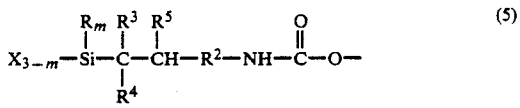

$$X_{3-m}-\underset{\underset{R^4}{|}}{\underset{|}{Si}}-\underset{\underset{}{|}}{\overset{R^3}{C}}-\underset{\underset{}{|}}{\overset{R^5}{CH}}-R^2-NH-\overset{\overset{O}{\|}}{C}-O- \quad (5)$$

is a bivalent organic group, preferably a lower alkylene group. Each of $R^3$, $R^4$ and $R^5$ is a hydrogen atom or a lower alkyl group. $R_2$ is preferably a bivalent organic group having from 1 to 17 carbon atoms, more preferably a bivalent hydrocarbon group, like $R^1$. This hydrocarbon group may contain an aromatic ring. A preferred hydrocarbon group is an alkylene group, and an alkylene group having from 1 to 8 carbon atoms, particularly an alkylene group having from 2 to 6 carbon atoms, are preferred. For example, a polymethylene group such as a dimethylene group, a trimethylene group or a tetramethylene group, is preferred. $R_2$ may be a urethane bond, a urea bond or an organic group containing other bonds formed by the reaction with an active hydrogen-containing group. Such a case will be described hereinafter in item (iv).

The compound (b) includes, for example, allyl isocyanate, 2-isocyanate methyl methacrylate and isopropenyldimethylbenzyl isocyanate. Allyl isocyanate is most preferred. The hydrosilane (c) is preferably the above-mentioned hydrosilane having a hydrolyzable silyl group. Further, by using a halohydrosilane wherein X is a halogen such as a chlorine atom, as the hydrosilane (c), it is possible that after forming the terminal group of the formula (5), the halogen is converted to a hydrolyzable silyl group other than the halogen, such as an alkoxy group. The reaction of the hydrosilane (c) and the α,β-unsaturated group, can be conducted by means of a conventional catalyst such as platinum.

(iii) A compound (d) having a hydrolyzable silyl group and an active hydrogen-containing group reactive with an isocyanate group, a polyisocyanate compound (e) and a polyoxyalkylene polyol, are simultaneously or sequentially reacted. The active hydrogen-containing group includes, for example, a hydroxyl group, a primary amino group, a secondary amino group, a carboxyl group and a mercapto group, and particularly preferred are a hydroxyl group, a primary amino group and a secondary amino group. The compound (d) and the polyisocyanate compound (e) may be, for example, those represented by the following formulas (6) and (7), respectively.

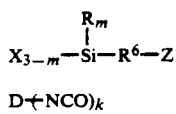
(6)

D-(NCO)$_k$ (7)

X, R and m are as defined in the formula (1), and R$^6$ is a bivalent organic group, Z is an active hydrogen-containing group, D is a residue obtained by removing an isocyanate group of a polyisocyanate compound, and k is an integer of at least 2. R$^6$ is preferably a bivalent hydrocarbon group, like R$^1$ and R$^2$, and an alkylene group having from 1 to 8 carbon atoms, particularly an alkylene group having from 2 to 6 carbon atoms, is preferred. Most preferably, it is a polymethylene group having from 2 to 6 carbon atoms. D is a residue of an aromatic, aliphatic or alicyclic polyisocyanate compound, and k is preferably an integer of from 2 to 4, particularly 2. The reaction of the above three reactants can be conducted simultaneously. However, it is preferred to react them sequentially. Namely, a polyoxyalkylene polyol and a stoichiometrically excess amount of a polyisocyanate compound (e) are reacted to obtain an isocyanate group-containing prepolymer, and a compound (d) is reacted thereto to obtain the desired compound. The polyoxyalkylene polyol may be polymerized by reacting it with a polyisocyanate compound (e). However, such polymerization brings about at least two urethane bonds between the polyoxyalkylene chains. Such polymerization is not so desirable. Therefore, such polymerization should preferably be less, if any. Accordingly, it is preferred to conduct the reaction at such proportions that one molecule of the polyisocyanate compound (e) reacts with one hydroxyl group of the polyoxyalkylene polyol. Preferably, at least N mol of polyisocyanate compound (e) is reacted to 1 mol of the polyoxyalkylene polyol, and if necessary, an unreacted polyisocyanate compound (e) is removed, whereby a prepolymer of the following formula (8) is obtained, and a compound (d) is reacted thereto to obtain the desired product.

(8)

A second method for sequential reaction comprises reacting the compound (d) and the polyisocyanate compound (e) in such a proportion that at least one isocyanate group remains, and reacting this reaction product with a polyoxyalkylene polyol. Namely, by the reaction of the compound (d) and the polyisocyanate compound (e), the product represented by the following formula (9) will be formed.

(9)

In the above formula, 1 is an integer of at least 1 and smaller than k and Z' is a group obtained by removing a hydrogen atom from Z.

In the formula (9), when k−1 is 1, the compound of the formula (9) can be reacted in the same manner as the compound of the formula (2) in the above item (i), with a polyoxyalkylene polyol to obtain the desired product. The compound (d) includes, for example, the following compounds:
γ-aminopropyltrimethoxysilane,
γ-aminopropyltriethoxysilane,
γ-aminopropylmethyldimethoxysilane,
N-aminoethylaminopropyltrimethylsilane,
N-aminoethylaminopropylmethylmethoxysilane,
1,3-diaminoisopropyltrimethoxysilane,
γ-hydroxypropyltrimethoxysilane and
γ-mercaptopropyltrimethoxysilane.

The polyisocyanate compound (e) includes, for example the following compounds:
tolylenediisocyanate, diphenylmethane diisocyanate, hexamethylene diisocyanate, isophorone diisocyanate, xylylene diisocyanate, methylene bis(cyclohexyl isocyanate), bis(isocyanatemethyl)cyclohexane, and 1,6-11-undecane triisocyanate,
as well as prepolymer type modified products, nurate type modified products, carbodiimide modified products and other modified products of the above polyisocyanates.

(iv) Instead of the compound (d) in the process of the above item (iii), a compound (f) having an α,β-unsaturated group and an active hydrogen-containing group, is used. A polyoxyalkylene compound having an α,β-unsaturated group is prepared from the compound (f), the polyisocyanate compound (e) and a polyoxyalkylene polyol in accordance with the method as disclosed in the above item (iii), and then the hydrosilane (c) as used in the above item (ii) is reacted to this α,β-unsaturated group to form a hydrolyzable silyl group. This compound (f) is, for example, a compound represented by the following formula (10).

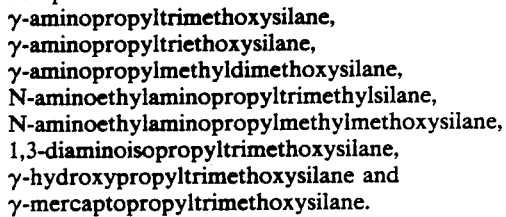
(10)

where R$_2$, R$^3$, R$^4$, Rhu 4, R$^6$ and Z are as defined above. The compound (f) includes, for example, allyl alcohol and allyl amine.

When contacted with moisture, the hydrolyzable silyl group-containing polyether compound of the present invention cures by a three dimensional cross linking reaction. The curing mechanism is such that firstly the hydrolyzable group X is substituted by a hydroxyl group, then the SiOH groups are condensed one another to form cross linking, whereby siloxane bonds (Si—O—Si), or such that by the reaction of a SiOH group and a SiX group, a siloxane bond and HX are formed for curing.

The hydrolysis rate varies depending upon the atmospheric temperature, the relative humidity and the type of the hydrolyzable group. Accordingly, a suitable hydrolyzable group should be selected depending upon the operational conditions to be employed.

Further, during the storage, this curable polyether compound must be kept free from contact with moisture, for example, by keeping it in dry nitrogen.

For the curing reaction, a curing catalyst may or may not be used. As the curing catalyst, metal salts of carboxylic acids such as an alkyl titanate, an organic silicon titanate, tin octylate and dibutyltin laurate; and amine salts such as dibutylamine-2-ethylhexoate; and other acid catalysts and basic catalysts, may be employed. Preferably, such a catalyst is used in an amount of from 0.01 to 5% by weight relative to the polyether compound.

If necessary, the polyether compound of the present invention may further contain a reinforcing agent, a filler, a plasticizer, a pigment, and an anti-sagging agent or a cross linking agent. The reinforcing agent includes carbon black and finely pulverized silica. The filler includes calcium carbonate, talc, clay and silica. The plasticizer includes dioctyl phthalate, dibutyl phthalate, dioctyl adipate, chlorinated paraffin and a petroleum type plasticizer. The pigment includes an inorganic pigment such as chromium oxide or titanium oxide and an organic pigment such as phthalocyanine blue or phthalocyanine green. The anti-sagging agent includes calcium carbonate treated with an organic acid, hydrogenated castor oil, aluminum stearate, calcium stearate, zinc stearate and finely pulverized silica. The cross linking agent includes a compound having a hydrogen atom of the above-mentioned hydrosilane converted to a hydrolyzable group or to an alkyl group, such as methyl trimethoxysilane or tetraethoxysilane.

The moisture-curable resin composition of the present invention is suitable for use as a coating composition for buildings, aircraft or automobiles, or as a sealing composition or a similar product.

Now, the present invention will be described in further detail with reference to Examples and Comparative Examples. However, it should be understood that the present invention is by no means restricted by such specific Examples.

The polyoxyalkylene polyols used in the following Examples and Comparative Examples were prepared by the following methods. Namely, by using a polyoxypropylene polyol having a molecular weight of from 400 to 600 as an initiator and a composite metal cyanide complex composed of a hexanecyanocobaltate zinc complex as a catalyst, propylene oxide was ring-opening addition polymerized to the initiator. Then, the product was purified to obtain the following polyol A, B or C. On the other hand, the catalyst used for the ring-opening addition polymerization of propylene oxide, was converted to a calcium catalyst, and ethylene oxide was further ring-opening addition polymerized, and the product was purified to obtain the following polyol D. Further, by using a polyoxyethylene block copolymer diol having an oxyethylene group-content of 50% by weight and a molecular weight of 3,000, as an initiator, propylene oxide was subjected to ring-opening addition polymerization in the presence of the above composite metal cyanide complex catalyst to obtain the following polyol E.

Further, the following polyol F is a polyoxyalkylene polyol prepared by a usual alkali catalyst.

Polyol A: a polyoxypropylene diol having a hydroxyl value of 12.5 mgKOH/g and a total degree of unsaturation of 0.020 meq/g.

Polyol B: a polyoxypropylene diol having a hydroxyl value of 6.3 mgKOH/g and a total degree of unsaturation of 0.025 meq/g.

Polyol C: a polyoxypropylene triol having a hydroxyl value of 5.6 mgKOH/g and a total degree of unsaturation of 0.027 meq/g.

Polyol D: a polyoxypropyleneoxyethylene diol having an oxyethylene group content of 15% by weight, a hydroxyl value of 12.5 mgKOH/g and a total degree of unsaturation of 0.020 meq/g.

Polyol E: a polyoxypropyleneoxyethylene diol having an oxyethylene group content of 15% by weight, a hydroxyl value of 12.5 mgKOH/g and a total degree of unsaturation of 0.020 meq/g.

Polyol F: a polyoxypropylene diol having a hydroxyl value of 65.0 mgKOH/g and a total degree of unsaturation of 0.038 meq/g.

In the following Examples and Comparative Examples, "parts" means "parts by weight" unless otherwise specified.

EXAMPLE 1

To 500 parts of polyol A, 9.2 parts of allyl isocyanate was added, and the mixture was reacted at 50° C. under a nitrogen stream until a NCO group was no longer detected by IR, to obtain an unsaturated terminal group-containing polyol.

Then, to the product thus obtained, 13.0 parts of methyldimethoxysilane and 0.003 part of a platinum-ethylene complex were added, and the mixture was reacted at 100° C. for 1 hour. After completion of the reaction, unreacted methyldimethoxysilane was distilled off under reduced pressure, and 5 parts of dibutyltin dilaurate was added as a curing catalyst to obtain a one component type room temperature curable synthetic resin.

EXAMPLE 2

To 500 parts of polyol A, 21.0 parts of isocyanate propylmethyldimethoxysilane OCNCH$_2$CH$_2$CH$_2$Si(CH$_3$)(OCH$_3$)$_2$ was added, and the mixture was reacted at 50° C. under a nitrogen stream until a NCO group was no longer detected by IR. After completion of the reaction, 5 parts of dibutyltin dilaurate was added as a curing catalyst to obtain a one component type room temperature curable synthetic resin.

EXAMPLE 3

To 500 parts of polyol B, 10.5 parts of isocyanate propylmethyldimethoxysilane OCNCH$_2$CH$_2$CH$_2$Si(CH$_3$)(OCH$_3$)$_2$ was added, and the mixture was reacted at 50° C. under a nitrogen stream until a NCO group was no longer detected by IR. After completion of the reaction, 5 parts of dibutyltin dilaurate was added as a curing catalyst to obtain a one component type room temperature curable synthetic resin.

EXAMPLE 4

To 500 parts of polyol B, 8.4 parts of isocyanate propylmethyldimethoxysilane OCNCH$_2$CH$_2$CH$_2$Si(CH$_3$)(OCH$_3$)$_2$ was added, and the mixture was reacted at 50° C. under a nitrogen stream until a NCO group was no longer detected by IR. After completion of the reaction, 5 parts of dibutyltin dilaurate was added as a curing catalyst to obtain a one component type room temperature curable synthetic resin.

EXAMPLE 5

To 500 parts of polyol C, 9.5 parts of isocyanate propylmethyldimethoxysilane OCNCH$_2$CH$_2$CH$_2$Si(CH$_3$)(OCH$_3$)$_2$ was added, and the mixture was reacted at 50° C. under a nitrogen stream until a NCO group was no longer detected by IR. After completion of the reaction, 5 parts of dibutyltin dilaurate was added as a curing catalyst to obtain a one component type room temperature curable synthetic resin.

COMPARATIVE EXAMPLE 1

To 500 parts of polyol F, 111.3 parts of isocyanate propylmethyldimethoxysilane OCNCH$_2$CH$_2$CH$_2$Si(CH$_3$)(OCH$_3$)$_2$ was added, and the mixture was reacted at 50° C. under a nitrogen stream until a NCO group was no longer detected by IR. After completion of the reaction, 5 parts of dibutyltin dilaurate was added as a curing catalyst to obtain a one component type room temperature curable synthetic resin.

EXAMPLE 6

To 500 parts of polyol D, 9.2 parts of allyl isocyanate was added, and the mixture was reacted at 80° C. under a nitrogen stream until a NCO group was no longer detected by IR to obtain an unsaturated terminal group-containing polyol.

Then, to the product thus obtained, 13.0 parts of methyldimethoxysilane and 0.003 part of a platinum-ethylene complex were added, and the mixture was reacted at 100° C. for 1 hour under stirring. After completion of the reaction, unreacted methyldimethoxysilane was distilled off under reduced pressure, and 5 parts of dibutyltin dilaurate was added as a curing catalyst to obtain a one component type room temperature curable synthetic resin.

EXAMPLE 7

To 500 parts of polyol E, 21.3 parts of isocyanate propylmethyldiethoxysilane OCN(CH$_2$)$_3$Si(CH$_3$)(OCH$_3$)$_2$ was added, and the mixture was reacted at 50° C. under a nitrogen stream until a NCO group was no longer detected by IR. After completion of the reaction, 5 parts of dibutyltin dilaurate was added as a curing catalyst to obtain a one component type room temperature curable synthetic resin.

EXAMPLE 8

100 Parts of polyol A was charged into a 1 l three-necked flask equipped with a stirrer, a thermometer and a nitrogen supply tube, and 3.9 parts of 2,4-tolylene diisocyanate was added thereto. The mixture was reacted at 80° C. for 8 hours under a nitrogen stream to obtain a prepolymer with NCO%=0.8%. Then, to 100 parts of this prepolymer, 3.4 parts of γ-aminopropyl trimethoxysilane was reacted at 80° C. for 5 hours. Then, 1.0 part of dibutyltin dilaurate was added thereto as a curing catalyst to obtain a one component type room temperature curable synthetic resin.

EXAMPLE 9

100 Parts of polyol B was charged into a 1 l three-necked flask equipped with a stirrer, a thermometer and a nitrogen supply tube, and 1.9 parts of 2,4-tolylene diisocyanate was added thereto. The mixture was reacted at 80° C. for 8 hours under a nitrogen stream to obtain a prepolymer with NCO%=0.5%. Then, to 100 parts of this prepolymer, 2.1 parts of γ-aminopropyl trimethoxysilane was reacted at 80° C. for 5 hours. Then, 1 part of dibutyltin dilaurate was added thereto as a curing catalyst to obtain a one component type room temperature curable synthetic resin.

EXAMPLE 10

100 Parts of polyol C was charged into a 1 l three-necked flask equipped with a stirrer, a thermometer and a nitrogen supply tube, and 1.7 parts of 2,4-tolylene diisocyanate was added thereto. The mixture was reacted at 80° C. for 8 hours under a nitrogen stream to obtain a prepolymer with NCO%=0.4%. Then, to 100 parts of this prepolymer, 1.7 parts of γ-aminopropyl trimethoxysilane was reacted at 80° C. for 5 hours. Then, 1 part of dibutyltin dilaurate was added thereto as a curing catalyst to obtain a one component type room temperature curable synthetic resin.

COMPARATIVE EXAMPLE 12

100 Parts of polyol F was charged into a 1 l three-necked flask equipped with a stirrer, a thermometer and a nitrogen supply tube, and 20.5 parts of 2,4-tolylene diisocyanate was added thereto. The mixture was reacted at 80° C. for 8 hours under a nitrogen stream to obtain a prepolymer with NCO%=4.1%. Then, to 100 parts of this prepolymer, 17.0 parts of γ-aminopropyl trimethoxysilane was reacted at 80° C. for 5 hours. Then, 1 part of dibutyltin dilaurate was added thereto as a curing catalyst to obtain a one component type room temperature curable synthetic resin.

The synthetic resins of the foregoing Examples and Comparative Examples were cured at 50° C. under a relative humidity of 60%. The physical properties of the cured products are shown in Table 1.

TABLE 1

| Synthetic resin | Tensile strength (kg/cm$^2$) | Elongation at breakage (%) | 50% Tensile stress (kg/cm$^2$) |
| --- | --- | --- | --- |
| Example 1 | 8.2 | 160 | 4.8 |
| Example 2 | 8.6 | 140 | 5.2 |
| Example 3 | 7.2 | 270 | 3.1 |
| Example 4 | 5.4 | 430 | 1.4 |
| Example 5 | 6.0 | 280 | 2.1 |
| Example 6 | 8.6 | 140 | 5.0 |
| Example 7 | 8.8 | 130 | 5.3 |
| Example 8 | 8.9 | 130 | 5.5 |
| Example 9 | 7.8 | 250 | 3.3 |
| Example 10 | 6.8 | 260 | 2.3 |
| Comparative Example 1 | 11.5 | 40 | 8.2 |
| Comparative Example 2 | 9.0 | 30 | 5.3 |

We claim:

1. A moisture-curable resin composition containing a hydrolyzable silyl group-containing polyether compound as a curable component, said polyether compound comprising polyoxyalkylene chains derived from a polyoxyalkylene polyol having a hydroxyl value, x mgKOH/G, wherein x ranges from to 5 to 35, a total degree of unsaturation, y meq/g, wherein y is not higher than 0.07 meq/g and h≦0.9/(x−10), from 2 to 8 hydroxyl groups, and a content of oxyalkylene groups having at least 3 carbon atoms, of at least 60% by weight, and a hydrolyzable silyl group-containing terminal group present at least 1.3 terminals on the average of said polyoxyalkylene chains, said terminal group having a urethane bond linked to the polyoxyalkylene chain.

2. The moisture-curable resin composition according to claim 1, wherein the polyoxyalkylene polyol is a polyoxyalkylene polyol consisting essentially of a polymer obtained by ring-opening addition polymerization of a monoepoxide by a polyvalent initiation.

3. The moisture-curable resin composition according to claim 1, wherein the polyoxyalkylene polyol is a polyoxyalkylene polyol obtained by ring-opening addition polymerization of an alkylene oxide having 3 or 4 carbon atoms, above or with ethylene oxide.

4. The moisture-curable resin composition according to claim 3, wherein the ring-opening addition polymerization reaction is conducted in the presence of a composite metal cyanide complex catalyst.

5. The moisture-curable resin composition according to claim 1, wherein the hydrolyzable silyl group is a silyl group having from 1 to 3 functional groups selected from the group consisting of a halogen atom, an alkoxy group, an acyloxy group, an amide group, an amino group, an aminooxy group and a ketoximate group.

6. The moisture-curable resin composition according to claim 1, wherein the hydroxyzable silyl group-containing terminal group is a terminal group derived from a compound having a hydrolyzable silyl group and an isocyanate group.

7. The moisture-curable resin composition according to claim 6, wherein the compound having a hydrolyzable silyl group and an isocyanate group is a silane having an isocyanate alkyl group and a hydrolyzable group.

8. The moisture-curable resin composition according to claim 1, which contains from 0.001 to 5% by weight, based on the hydrolyzable silyl group-containing polyether compound, of a curing catalyst.

9. The moisture-curable resin composition according to claim 1, wherein the hydrolyzable silyl group-containing polyoxyalkylene compound is obtained by reacting a polyoxalkylene polyol having a hydroxyl value, x mgKOH/g, wherein x ranges from 5 to 35, a total degree of unsaturation, y mgq/g, wherein y is not greater than 0.07 meq/g and $y \leq 0.9/(x-10)$, from 2 to 8 hydroxyl groups and a content of oxyalkylene groups having at least 3 carbon atoms of at least 60% by weight with a compound having a hydrolyzable silyl group and an isocyanate group in amounts of at least 1.3 molecules of hydrolyzable silyl group-isocyanate group containing compound per molecule of said polyoxyalkylene polyol.

10. The moisture-curable resin composition according to claim 1, wherein the hydrolyzable silyl group-containing terminal group of the polyether compound is formed by the reaction of a compound which contains a hydrolyzable silyl group and an active hydrogen atom with a compound having at least two isocyanate groups, one of which reacts with said active hydrogen atom while the other reacts with the hydroxyl group of said polyoxyalkylene polyol.

11. The moisture-curable resin composition according to claim 1, wherein the hydrolyzable silyl group-containing polyoxyalkylene compound is obtained by reacting an (A) isocyanate group-containing prepolymer obtained by reacting a polyoxyalkylene polyol having a hydroxyl value, x mgKOH/g, wherein x ranges from 5 to 35, a total degree of unsaturation, y meq/g, wherein y is not greater than 0.07 meq/g and $y \leq 0.9/(x-10)$, from 2 to 8 hydroxyl groups and a content of oxyalkylene groups having at least 3 carbon atoms, of at least 60% by weight, with a stoichiometrically excess amount of a polyisocyanate compound, and a (B) compound having a hydrolyzable silyl group and an active hydrogen-containing group reactive with an isocyanate group in amounts on average of at least 1.3 molecules of said compound (B) per molecule of compound (A).

12. The moisture-curable resin composition according to claim 1, wherein the hydrolyzable silyl group-containing polyoxyalkylene compound is obtained by reacting said polyoxyalkylene polyol having a hydroxyl value, x mgKOH/g, wherein x ranges from 5 to 35, a total degree of unsaturation, y meq/g, wherein y is not greater than 0.07 meq/g, and $y \leq 0.9/(x-10)$, from 2 to 8 hydroxyl groups, and a content of oxyalkylene groups having at least 3 carbon atoms, of at least 60% by weight and a compound having an isocyanate group and an $\alpha,\beta$-unsaturated group in amounts of at least 1.3 molecules of said isocyanate group-unsaturated group containing compound per molecule of said polyoxyalkylene polyol, followed by reacting said hydrolyzable silyl group-containing polyoxyalkylene compound with a hydrolyzable group-containing hydrosilane.

13. The moisture-curable resin composition according to claim 12, wherein the compound having an isocyanate group and an $\alpha,\beta$-unsaturated group is allyl isocyanate.

14. The moisture-curable resin composition according to claim 10, wherein the compound containing a hydrolyzable silyl group and an active hydrogen-containing group reactive with an isocyanate group, is a silane having a hydrolyzable group and an alkyl group having an active hydrogen-containing group selected from the group consisting of a hydroxyl group, a primary amino group and a secondary amino group.

* * * * *